June 13, 1950 W. S. BACHMAN 2,511,664

PHONOGRAPH PICKUP

Filed Dec. 29, 1945 2 Sheets-Sheet 1

Inventor:
William S. Bachman,
by Merton D Moore
His Attorney.

June 13, 1950 W. S. BACHMAN 2,511,664

PHONOGRAPH PICKUP

Filed Dec. 29, 1945 2 Sheets-Sheet 2

Inventor:
William S. Bachman,
by Merton D. Morse
His Attorney.

Patented June 13, 1950 2,511,664

UNITED STATES PATENT OFFICE 2,511,664

PHONOGRAPH PICKUP

William S. Bachman, Southport, Conn., assignor to General Electric Company, a corporation of New York Application December 29, 1945, Serial No. 638,379

11 Claims. (Cl. 179—100.41)

My invention relates to vibration translating devices such as phonograph pickups and more particularly to phonograph pickups employing high resistance wires for converting mechanical vibrations into electrical variations. This application is a continuation in part of my copending application Serial No. 565,537, filed November 28, 1944, now Patent 2,491,794, issued December 20, 1949, and assigned to the same assignee as the present invention.

In the construction of phonograph pickups it is desirable that the moving parts be made as light and as free moving as practicable in order to minimize damage to the record sound tracks and to enable the stylus point to follow the sound tracks accurately over the desired range of frequencies of the recorded sounds. It is desirable also to minimize all extraneous sounds or noises and for this purpose the pickup should be designed to have minimum response to mechanical disturbances other than the vibrations produced by the sound track. Furthermore in order to obtain true reproduction of the recorded sound it is desirable that the pickup response curve shall be as nearly linear as possible within the range of frequencies of the recorded sound.

It is an object of my invention to provide a phonograph pickup including an improved vibration translating element of light and simple construction.

It is another object of my invention to provide a phonograph pickup employing a wire resistance transducer element including an improved arrangement for insuring linear response within a desired range of frequencies.

It is a further object of my invention to provide a phonograph pickup including an improved arrangement for damping low frequency vibrations to prevent excessive vibration of the stylus member at the resonant frequencies of the mechanical parts of the pickup.

Figure 2:
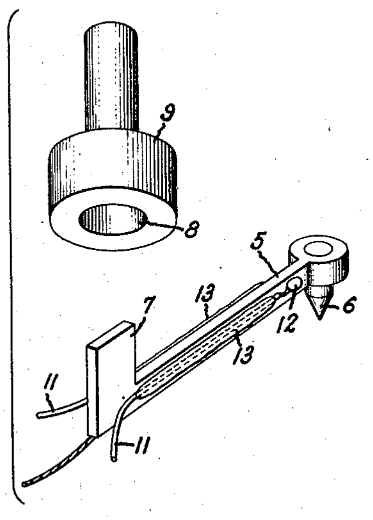
Figure 1:
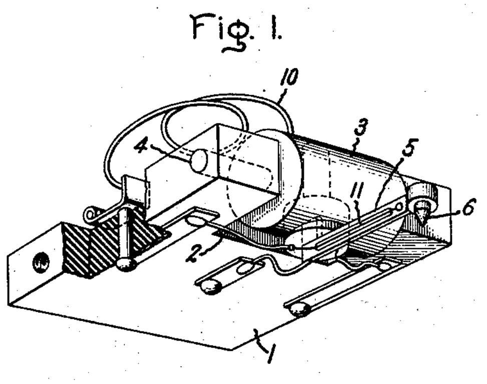
Figure 3:
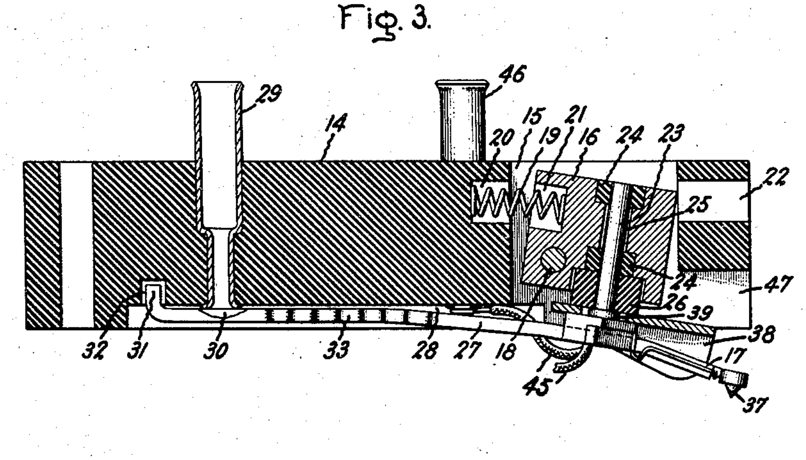
Figure 4:
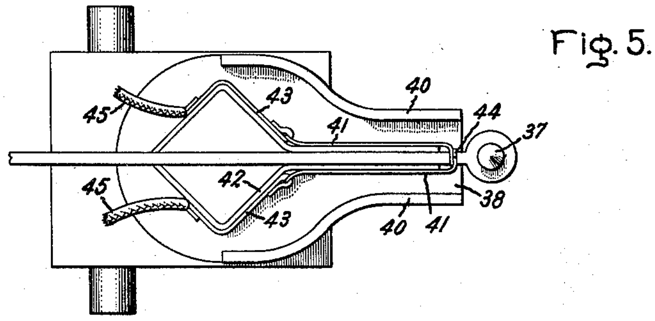
Figure 5:
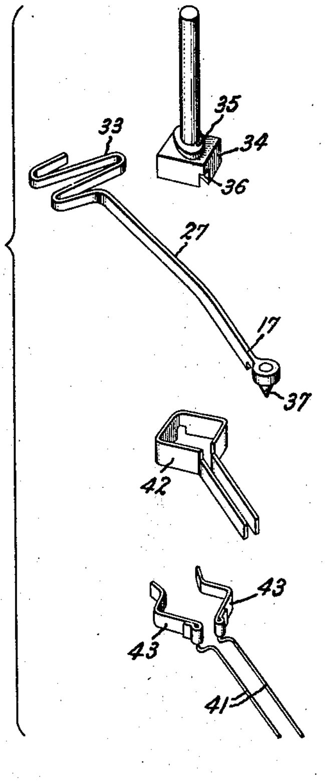
Figure 6:
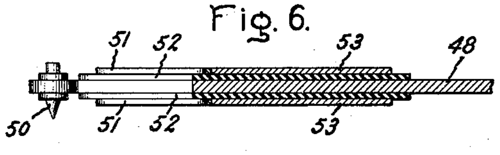
Figure 7:
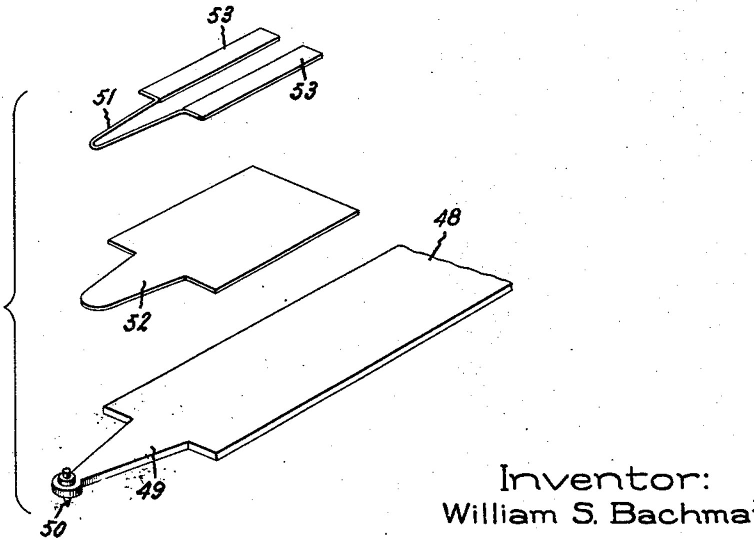

The novel features which are believed to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 is a perspective view, partly in section, of a phonograph pickup embodying my invention; Fig. 2 is an enlarged exploded view of the stylus member and support of the pickup shown in Fig. 1; Fig. 3 is a sectional side elevation of a pickup illustrating a modified form of my invention; Fig. 4 is an enlarged bottom plan view of the stylus member and support of the pickup of Fig. 3; Fig. 5 is an exploded perspective view of the stylus member and associated parts shown in Fig. 4; Fig. 6 is a side elevation, partly in section, of a modified form of stylus member for sound tracks of the hill and dale type; and Fig. 7 is an exploded perspective view of several of the elements of the stylus member shown in Fig. 6.

Briefly, each of the pickups illustrated in the drawing is provided with a stylus member arranged as a cantilever beam and having bonded thereto a fine electrical resistance wire so arranged that the wire is strained in proportion to the vibrations of the stylus as it moves over a record sound track. The resistance wires are arranged so that they are never strained to their elastic limits and the variation in electrical resistance is directly proportional to the vibration of the stylus. Distortion of the reproduced sounds because of tone arm resonance and other disturbances is minimized by damping arrangements particularly suited to the lightweight cantilever beam construction of the stylus member.

Referring now to the drawings, the pickup illustrated in Fig. 1 is so constructed as to make possible effective damping to prevent distortions due to vibrations other than those produced by the sound track. This pickup comprises a head 1 of insulating material provided with a recess 2 at its forward end in which a supporting block 3 is mounted on trunnions 4, only one of which is illustrated. The head 1 is arranged to be secured on a phonograph tone arm (not shown) in any suitable manner. The block 3 supports a resilient stylus member 5 having a stylus point 6 at its end remote from the block 3. In the drawing, by way of example, the stylus point 6 has been illustrated as a separate jewel mounted in the end of the stylus member. As shown in Fig. 2, the member 5 has an upwardly projecting lug 7 formed at its rear end and which is fitted into a circular recess 8 in an upright metal pivot member or post 9. The lug 7 fits snugly in the recess 8 and is secured therein by a suitable cement, and the post 9 is pivotally mounted in the block 3 so that the stylus member 5 is mounted for rotation on either of two axes at right angles to one another. The trunnions 4 of the block 3 and the pivot member 9 are all lubricated with a viscous liquid in order to provide damping action and prevent distortion due to low velocity displacements of the stylus member 5. The viscous liquid or damping fluid is selected so that at the velocities of the displacement produced by vibration of the stylus point in a sound track the pivot member 9 and block 3 will remain stationary; however, when displacements at lower velocities occur the pivot member and block will move and minimize strain on the stylus member. One suitable liquid for lubricating these bearings is a solution of polymerized isobutylene in mineral oil. The precise values of friction and damping effect necessary to provide the required frequency characteristics may be determined in accordance with the well-known principles of mechanics applicable to vibrating systems including elastic elements. In order to limit rotation about the trunnions 4 when the stylus 6 is bearing on the record, a spring 10 is provided between the head 1 and the block 3. This spring is selected to have sufficient force to counterbalance the unbalanced weight of the tone arm and maintain the stylus 6 in its desired position.

In order to reproduce electrically the vibrations of the stylus member, resistance wires 11 are secured to the sides of the stylus member 5 and the ends of the wires adjacent the stylus point 6 are soldered or otherwise suitably secured in good electrical contact with the stylus member 5 as indicated at 12. The wire 11 may be made of Nichrome or other suitable material and should be selected to have uniform elasticity and electrical resistance throughout its length. The diameter of the wire may be of the order of one one-thousandth of an inch. Each of the wires 11 has a straight portion extending along the member 5 and securely bonded to the arm by a resilient insulating cement indicated at 13. This cement may be any suitable resilient cementing material, such for example as an alkyd resin. The straight portions of the wires are secured on opposite sides of the stylus members 5 and therefore only one of the straight portions is visible in the drawing. When the stylus point 6 is vibrated, the member 5 bends and the straight portions of the wires 11, which are bonded to the member, are strained in proportion to the bending of the member. One of the wire portions is strained in tension and the other in compression during the bending of the stylus member and the electrical resistances are accordingly varied oppositely. The resistance portions therefore can be connected in the electrical circuit of a suitable amplifying apparatus (not shown) to utilize the variations of resistance for the reproduction of the recorded sounds. Circuits of this type are well known in the art, and one such circuit is disclosed in my aforementioned copending application. The stylus member 5 has been illustrated as having greater depth than width so that there will be little bending of this member in the vertical plane; however, should the member 5 bend in the vertical plane both straight portions of the wire 11 will be strained equally in the same direction and any variations in resistance will be equal and may be balanced out in the electrical circuit. In some applications, however, it may be desirable to employ only one of the wires 11 and in such case the variations due to vertical bending of the member 5 cannot be balanced out in the electrical circuit; to overcome this difficulty, the single straight portion of the wire is then located as nearly as possible along the neutral axis of the member 5 when considered as a cantilever beam. The neutral axis is a line along which there is no strain in the material of the beam, the material on one side of the line being strained in compression and on the other side in tension. By locating the resistance wire along the neutral axis, straining of the wire is minimized.

The damping arrangement including the pivotal support of the stylus member on horizontal and vertical axes makes it possible to minimize distortions due to vibrations such as those of the pickup and associated parts at the resonant frequency of the assembly. Other low frequency vibrations, such as those due to unevenness in the surface of the record disk are also damped out. Because the dynamic mass of the stylus is very small the pickup may be mounted on a tone arm with a very small unbalanced weight, for example a weight of the order of one-half ounce, and the stylus point 6 may be made to follow the record groove and trace the recorded vibrations with accuracy over a wide band of frequencies.

In the pickup illustrated in Figs. 3, 4 and 5 there is provided a compact arrangement for mounting a stylus member of the type employed in the pickup of Fig. 1 and including a similar damping arrangement of the pivotal supports for the stylus member. As illustrated in Fig. 3, the pickup comprises a head 14 constructed of rigid insulating material and provided with a rectangular opening 15 extending from the top to the bottom thereof near the forward end of the head.

A rocker block 16 for supporting a stylus member 17 is pivotally mounted within the recess 15 on a shaft 18. The block 16 may be constructed of light metal, such as aluminum, and the size of the block is such that its pivotal movement within the recess 15 is limited by the walls of the recess. A spring 19 is mounted in recesses 20 and 21 in the head 14 and block 16, respectively, and biases the block 16 forwardly in a clockwise direction, as viewed in Fig. 3, so that the front end of the block 16 rests against the front wall of the recess 15. A drill hole 22 in the forward wall of the recess 15 is present merely because it is formed during the drilling of the recess 20 in the head at the rear wall of the recess 15. The member 17 is mounted on an upright post 23 on washers 24 of resilient insulating material, such as the cellulose nitrate plastic sold under the trade name "Pyralin." These washers hold the post 23 in spaced relation to the sides of an upright bore 25 in the rocker block 16. A third washer 26 of the same or similar material to that of the washers 24 is provided at the lower end of the post 23 in an enlarged portion of the upright bore 25. Two washers 24 and the washer 26 provide the desired damping action to suppress undesired vibration of the stylus member. The stylus member 17 is a forwardly extending portion of a resilient bar 27 which extends rearwardly from the post 23 in a downwardly opening recess 28 in the head 14 and is soldered to the lower end of a conducting metal sleeve 29, as indicated at 30. The rear end of the bar 27 is upturned at 31 within a recess 32 in the head which serves to locate the bar during assembly of the pickup. The forward end of the stylus member 17 is provided with a suitable stylus point, as indicated at 37, which may be formed on or secured to the member 17 in any suitable manner. The portion of the bar 27 between the sleeve 29 and the post 23 is bent sinuously in a horizontal plane as indicated at 33 to provide a spring which cooperates with the spring 19 to determine the position of the block 16 when the stylus point 37 is resting on a record.

The details of construction of the post 23 and the method of supporting the stylus member 17 are shown in Figs. 4 and 5. The post is provided with an enlarged lower end 34 of square cross section and having a shoulder 35 of oblong cross section at the top thereof. A diagonal slot 36 in the head portion 34 receives the rod 27 which is secured therein by soldering. A metal shield 38 is secured on top of the head portion 34 and has an opening 39, indicated in Fig. 3, of the same oblong shape as the shoulder 35, the shoulder being of the same height as the thickness of the shield 38. The oblong shape of the shoulder holds the shield in the desired position with respect to the stylus member. The shield 38 is provided with downwardly extending side members 40 which prevent injury to the member 17 during handling of the pickup head. Two lengths of fine resistance wire 41 are secured to either side of the stylus member 17 over a paper insulator 42 shaped as shown in Fig. 5 to cover the sides of the square head 34 and of the stylus member 17. The two lengths of high resistance wire 41 are secured to metal foil ribbons 43 and the wires, together with the ribbons and the paper insulation 42 are bonded to the sides of the block 34 and member 17 by a suitable resilient cement. The forward ends of the wires 41 are soldered or otherwise suitably secured to the stylus member 17 as indicated at 44. The positions of the wires 41 along the stylus member 17 are made alike on both sides and preferably the wires lie along the neutral axis of the member with respect to bending in a vertical plane. This position of the wires minimizes or prevents distortion due to bending of the stylus member 17 laterally in directions other than the normal direction of vibration of the stylus point 37 when following the sound track of a record. The ribbons 43 are connected by wires 45 to two upright sleeves 46 of the same construction as the sleeve 29 and mounted in the head rearwardly of the recess 15. Only one of the sleeves 46 is shown in the drawing since the view of the head 14 in Fig. 3 is a section along the centerline thereof. The sleeves 46 are riveted in position on the head 14 in the same manner as the sleeve 29, and the wires 45 are soldered to the lower ends of the respective sleeves. The three leads of a conventional electric circuit may thus be connected to the sleeve 29 and the two sleeves 46, the connections being the same as those for the pickup of Fig. 1.

The pressures exerted by the springs 19 and 33 are selected so that when the stylus 37 is engaging a record sound track, the block 16 will be in a position out of contact with the front and back walls of the recess 15 and the springs will carry the unbalanced weight of the tone arm. Interference between the shield 38 and the block 14 is avoided by providing a downwardly opening recess 47 at the forward end of the head 14 and opening into the recess 15.

Damping to prevent interference due to mechanical resonance frequencies of the pickup and associated tone arm is provided by the resilient washers 24 and 26. These washers perform the function of the viscous lubricant in the pickup of Fig. 1 and prevent rotation of the post 23 upon lateral displacement of the stylus member 17 at the high velocities produced by the recorded sound track. The washers, together with the springs 19 and 33, also afford movement of the stylus member 17 without bending when low velocity forces are applied in any direction.

In Figs. 6 and 7 there is illustrated a stylus member particularly adapted for use with phonograph sound tracks of the hill and dale type. In the drawings only the stylus member has been illustrated; the attachment of this member to a pickup head may be made in a manner similar to that employed with the pickups of Figs. 1 and 2. The pickup illustrated comprises a flat plate 48 arranged to be secured to a pickup head and having extending from the forward end thereof a triangular portion 49 which constitutes the stylus member of the pickup. The portion 49 is constructed so that its cross sectional area decreases progressively from its base toward its outer end so that when a force is applied to its outer end, bending throughout the length of the stylus member is uniform. A suitable stylus point 50 is provided at the outer end of the member 49 and is adapted to ride in the groove of a hill and dale type phonograph record so that the member 49 is bent as a cantilever beam in a vertical plane by vibration of the stylus point 50. In order to convert the stylus vibrations into electrical variations, resistance wires 51 similar to the wires employed in the pickups of Figs. 1 and 3 are secured on the top and bottom sides of the member 49 with paper insulators 52 lying between the wires and the plate 48. Only the upper wires 51 and insulators 52 are shown in Fig. 7. It will be understood, however, that the lower elements are of the same construction. The wires 51 are secured to ribbons 53 similar to the ribbons 43 employed in the pickup of Fig. 4. Lateral displacements of the stylus point 50 produce substantially no bending of the member 49 because of its triangular shape and resistance to bending in a lateral direction; however, the wires 51 are so arranged that any changes in resistance due to such bending may be balanced out in the electrical circuit.

It will readily be apparent to those skilled in the art that the pickups I have illustrated and described may be arranged in many ways to utilize the features of my invention; for example, all forms illustrated may be employed either with laterally cut or hill and dale type records by arranging for vibration of the stylus member in the required direction. I do not, therefore, desire my invention to be limited to the particular arrangements illustrated and described and I intend by the appended claims to cover all modifications which fall within the spirit and scope of my invention.

What I claim as new and desire to secure by Letters Patent of the United States, is:

1. A phonograph pickup comprising a supporting head, a thin resilient elongated stylus member having a broad face and having a stylus point at one end, means including a pivotal connection for mounting said member on said head whereby said stylus point is positioned for engagement in a record sound track and is vibrated upon movement over such track, an electrical resistance secured to the broad face of said member and arranged to be strained upon bending of said member, and means for damping the pivotal movement of said member at relatively high velocities whereby movement of said stylus point over a sound track bends said member and thereby varies said resistance in proportion to the vibrations of said stylus point.

2. A phonograph pickup comprising a supporting head, an elongated stylus member having a stylus point at one end, means for mounting said member for pivotal movement in two planes at right angles to one another, said stylus point being positioned for engagement in a record sound track and being vibrated upon movement over such track, an electrical resistance secured to said member and arranged to be strained upon bending of said member, and means for damping the pivotal movement of said member at relatively high velocities whereby movement of said stylus over the sound track bends said member and thereby varies said resistance in proportion to the vibrations of said stylus point.

3. A phonograph pickup comprising a supporting head, a block pivotally mounted on said head for movement about a horizontal axis, an elongated stylus member pivotally mounted on said block for movement about an upright axis, said member having a stylus point on its end remote from said block, said member extending from said head to maintain said stylus point in position for engagement with a record sound track whereby said stylus point is vibrated laterally with respect to said upright axis, an electrical resistance secured to said member and arranged to be strained upon bending of said member, means for resiliently restricting the pivotal movement of said block, and means for damping the pivotal movement of said member about said upright axis at relatively high velocities whereby movement of said stylus point over the sound track bends said member and thereby varies said resistance in proportion to the lateral displacement of said stylus point.

4. A phonograph pickup comprising a supporting head, a block pivotally mounted on said head for movement about a horizontal axis, a resilient metal rod pivotally mounted on said block for movement about an upright axis, said rod having one portion extending forwardly beyond said block and constituting a stylus member and another portion extending rearwardly and connected to said head, said stylus member having a stylus point at its end remote from said block, said other portion of said rod being shaped to provide a spring connection between said block and said head, an electrical resistance secured to said stylus member and arranged to be strained upon bending of said member, and means for damping the pivotal movement of said rod about said upright axis at relatively high velocities whereby movement of said stylus over the sound track bends said stylus member and thereby varies said resistance in proportion to the lateral displacement of said stylus point.

5. A phonograph pickup comprising a supporting head having a recess therein, a block arranged within said recess and pivotally mounted on said head for movement about a horizontal axis whereby the walls of said recess determine the maximum range of movement of said block, an elongated stylus member pivotally mounted on said block for movement about an upright axis, said member having a stylus point on the end thereof remote from said block, said member extending from said head to maintain said stylus point in position for engagement with a record sound track whereby said stylus point is vibrated laterally with respect to said upright axis upon movement over a sound track, an electrical resistance secured to said member and arranged to be strained upon bending of said member, means for resiliently restricting the pivotal movement of said block, and means for damping the pivotal movement of said member about said upright axis at relatively high velocities whereby movement of said stylus point over the sound track bends said member and thereby varies said resistance in proportion to the lateral displacement of said point.

6. A vibration translating device comprising a support, an elongated stylus member constituting a cantilever beam connected to said support and having a stylus point on its end remote from said support, and an electrical resistance wire extending longitudinally of said member and bonded thereto whereby said wire is strained in accordance with vibrations of said stylus point and the resistance of said wire is varied in proportion to such vibrations, said member being formed with progressively decreasing cross sectional areas from said support toward said point whereby it bends uniformly throughout its length when said point is displaced.

7. A phonograph pickup for records of the hill and dale type comprising a supporting head, a stylus member supported at one end on said head and having a stylus point at its other end, said member comprising a horizontal metal plate of uniform thickness secured to said head and having a triangularly shaped portion projecting from said head toward said point whereby vertical stress on said point produces uniform bending of said portion, and an electrical resistance wire having a length secured closely to said triangular portion of said plate whereby said length of said wire is strained by bending of said member produced by vibration of said stylus point and the resistance of said length of wire is varied in accordance with such vibrations produced by movement of said stylus point along the sound track of a record of the hill and dale type.

8. A phonograph pickup comprising a supporting head, a carrier member, a spring and damping means connected in parallel relationship between said member and said head for positioning said member on said head and for damping low velocity movement of said member, a resilient stylus member secured to said carrier member and extending therefrom as a cantilever beam, said stylus member having a stylus point at its end remote from said carrier member and adapted to engage the sound track of a record, and means dependent upon vibrations of said stylus point for converting such vibrations to electrical current variations.

9. A stylus mounting for an electric translating device comprising, in combination, a thin, flexible, relatively broad reed mounted with its broad face in a vertical plane and its axis in a substantially horizontal position, means for supporting one end of said reed with its broad face in a vertical plane, and a stylus supported entirely by said reed near the free end thereof and with its axis located substantially in the plane of said reed and arranged substantially at right angles to the axis of said reed, said supporting means having a high resistance to displacement at the velocities of displacement of said stylus due to vibrations produced by a sound track, thereby substantially to prevent upward flexure of said free end at said velocities while allowing lateral flexure thereof.

10. A stylus mounting for an electric translating device comprising, in combination, an elongated, relatively thin, flexible reed arranged with its principal axis extending horizontally, means for supporting one end of said reed with the broad face thereof in a vertical plane, and a stylus supported entirely by said reed near the free end thereof and arranged with its axis substantially in a vertical direction, said supporting means having a high resistance to displacement at the velocities of displacement of said stylus due to vibrations produced by a sound track, thereby substantially to prevent upward flexure of said free end at said velocities while allowing lateral flexure thereof.

11. A stylus mounting for an electric translating device comprising, in combination, an elongated reed-like member arranged with its principal axis extending horizontally, means for supporting one end of said member, the supported end of said member being relatively thin horizontally and wide vertically to provide a greater degree of flexure of said member about said supporting means horizontally than vertically, and a stylus supported entirely by said member near the free end thereof and having its axis arranged in substantially a vertical direction, said supporting means having a high resistance to displacement at the velocities of displacement of said stylus due to vibrations produced by a sound track, thereby substantially to prevent upward flexure of said free end at said velocities while allowing lateral flexure thereof.

WILLIAM S. BACHMAN.

REFERENCES CITED

The following references are of record in the file of this patent:

UNITED STATES PATENTS

| Number | Name | Date |
|---|---|---|
| Re. 22,589 | Ruge | Jan. 9, 1945 |
| 918,303 | Ellis | Apr. 13, 1909 |
| 1,757,547 | Reuben | May 6, 1930 |
| 2,252,464 | Kearns | Aug. 12, 1941 |
| 2,316,203 | Simmons | Apr. 13, 1943 |
| 2,373,676 | Germeshausen | Apr. 17, 1945 |
| 2,380,514 | Germeshausen | July 31, 1945 |